3,498,842
Patented Mar. 3, 1970

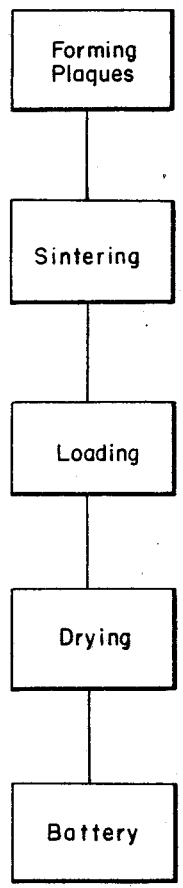

3,498,842
ELECTRODES, ELECTRODE CELLS AND METHOD
John J. Rowlette, Arcadia, Calif., assignor to Hughes Aircraft Company, Culver City, Calif., a corporation of Delaware
Filed Oct. 25, 1967, Ser. No. 678,038
Int. Cl. H01m 13/00; 43/04
U.S. Cl. 136—28                5 Claims

ABSTRACT OF THE DISCLOSURE

Improvement in electrode efficiency and battery electrodes utilizing a gold substrate modified with nickel oxide and a method of treatment eliminating gas buildup, shortening charging period, and reducing battery weight.

This invention relates to a method of improving upon the manufacture and efficiency of electrodes, electrodes produced thereby, batteries provided therewith and the products thereof. More particularly, this invention relates to an improved method of producing battery electrodes of improved charge acceptance having a gold substrate modified with active nickel, the products thereof, and the battery improvements provided in increasing the charging and operating efficiency thereof.

An important cell (battery) of conventional usage is the nickel-cadmium, in which nickel substrates are used as current collectors. Such cells require extra strength to prevent rupture during charging or a third electrode which will either increase the rate of recombination of excess evolution of oxygen gas or give an electrical signal to slow down or stop the charging when gassing begins. Thus, as is recognized in the art, the problems are to overcome oxygen evolution, known as gassing of the positive electrodes, how to increase battery charging efficiency, provide a higher ultimate state of charge, improving operation at higher temperatures, and increase battery life.

Accordingly, it is an object of this invention to provide a method and structure overcoming the above problems and affording the art the benefits of improved electrode and battery structure.

Another object of this invention is to provide the art with a method of manufacture of improved electrode structure and the structure provided thereby.

A further object of this invention and improvement in the art is to provide a new teaching affording the art with reduced battery weight, greater efficiency in charging time by trickle charging and maximum allowable charge rates with improvement in battery life.

Further objects and advantages will be recognized from the following description in conjunction with the accompanying drawing diagrammatically illustrating the method of preparing and utilizing the electrodes embodied herein.

As diagrammatically illustrated, a plurality of gold plaque electrode substrates are formed or prefabricated by press compacting and sintering of suitable gold particulates in the manner of conventional nickel plaques and of substantially identical dimension, as indicated by steps 1 and 2. A preferred method is by pressing gold particulates of 1–10 micron size by a press process as disclosed in application S.N. 451,596 of Roger R. Turk for "Prefabrication of Controlled Porosity Metals." After sintering, in a conventional manner, or as disclosed therein, the porous plaques are prepared for installation as battery electrodes by loading, as in step 3, with an active material.

A conventional method of loading in a vacuum may be used, consisting of evacuating and immersing the prepared plaque in a conventional concentrated (about 5–6 M) nickel nitrate solution, heated to about 70° C., while maintaining the plaques in a vacuum. In this method of loading conventional electrodes this step is repeated 6 to 8 times to obtain a more complete penetration of the solution. After multiple treatment with the nickel nitrate solution, the plaque is removed from the solution and oven dried, as in step 4. After drying, the plaque is immersed in a 32% conventional potassium (KOH) solution to convert the nitrate to the hydroxide. After conversion, the loaded plaque is washed, preferably in distilled water, and ready for insertion in a conventional manner in a battery case provided therefor (not shown per se).

In loading the porous gold electrodes provided herein, the preferred method is to place the gold plaques or electrodes in a conventional boiling nickel nitrate solution (over 100° C.) for several minutes, removing, drying and converting the nitrate to the hydroxide, followed by washing, as provided in the finishing steps above. To more completely insure loading the first step of boiling in the nickel nitrate solution may be repeated. However, it has been discovered that only one loading step yields a satisfactory electrode capacity for demonstrating the invention and is less time consuming, eliminating the several additional treatment steps of the known art.

After the electrodes were prepared, they were installed in a cell which was instrumented to yield individual electrode potentials (not shown). Upon testing, a comparison of the gold plaque cells with conventional nickel-cadmium cells, the improvements, aside from providing a decrease in the amount and rate of gassing and increasing the cycle life over that of a conventional cell, provided a surprising improvement in the charging efficiency and charging capacity with change in charging rate and temperature as shown by the average of several runs, as follows:

TABLE I.—ROOM TEMPERATURE CHARGE-DISCHARGE CHARACTERISTICS

| Charge rate, ma. | Capacity, percent | | |
|---|---|---|---|
| | Control electrode | Conventional cells | Au-plaque electrode |
| 100 | 100 | 100 | 100 |
| 100–20 | 92 | 89 | 98 |
| 100–10 | 74 | 83 | 100 |

TABLE II.—50° C. CHARGE-DISCHARGE CHARACTERISTICS

| Charge rate, ma. | Capacity, percent | | |
|---|---|---|---|
| | Control electrode | Conventional cells | Au-plaque electrode |
| 100 | 85 | 62 | 100 |
| 100–20 | 70 | 36 | 91 |
| 100–10 | 52 | 50 | 62 |

The first half of the charge in each case was done at 100 ma. Since the geometrical area of the electrode was exactly 10 cm.$^2$, the current density was 10 ma./cm.$^2$. For the rates marked 100–20 and 100–10, the second half of the charging was done at 20 ma. and 10 ma., respectively. Only the second half of the charging was done at the lower rate since it is at the higher states of charge that differences in charging efficiency become important. In every case, the discharge was carried out at 50 ma. to the point at which the electrode under test went negative with respect to the Hg/HgO reference electrode. This cut-off voltage corresponds to about 10 ma./cm.$^2$. Therefore, the charging rates correspond, in terms of current density, to the 1 hour, 5 hour, and 10 hour rates and the discharge rate corresponds to the two-hour rate. This procedure corresponds to a standard test of standard cells (electrodes) and for that reason a direct comparison between such tests and the gold substrate electrodes is meaningful. The conventional tests are concerned with cells, instead of electrodes, but the effects of charging rates and temperature on charge-discharge efficiency (i.e., current efficiency) are well known to be due to the behavior of the nickel oxide electrode. This is especially true with positive limited cells, as are the cells considered herein. Such cells have an excess of negative active material and maximum capacity is determined by the positive electrode.

In no case was the current efficiency 100% up to the theoretical capacity of the electrode. In general, the theoretical capacity is never known, except in the case of an inert plaque, such as gold, since in the loading process the nitrate ion oxidizes the nickel substrate which is subsequently converted into $Ni(OH)_2$. That is, weighing the plaque before and after the loading process, except in the case of the gold plaque, does not enable a calculation of the weight of $Ni(OH)_2$ to be made since the weight of the plaque is reduced by an unknown amount. This is especially true with the higher solution temperatures used in the present loading technique. But a good comparative picture can be obtained by comparing the change in electrode capacity with change in charging rate and temperature, as above illustrated.

It has been discovered that by replacing the loaded electrode as herein provided, in conventional nickel-cadmium cell structure (not shown) the ultimate state-of-charge of the cells is improved in that a smaller cell with lower nominal capacity can be used, without excess negative active material, or with a reduced amount of excess negative active material, and yet provides improved charging efficiency in that the cells are of less weight and less sensitive to temperature. Further, unlike the present known nickel-cadmium cells, the cells (batteries) not shown, provided with the gold substrate nickel oxide electrodes, as described, are capable of accepting a trickle charge, or more rapid charging, without detrimental gassing and for repetitive prolonged periods.

Having described the present embodiments of my discovery in accordance with the patent statutes, it will now be apparent that some modifications and variations may be made without departing from the spirit and scope thereof. The specific embodiments described are provided by way of illustration and are illustrative of my discovery, invention, or improvement which is to be limited only by the terms of the appended claims.

What is claimed is:
1. An electrode structure of nickel oxide consisting of a sintered electrode substrate consisting of gold with a surfacing of active nickel oxide.
2. An electrode structure consisting of a gold substrate consisting of sintered, gold particles impregnated with a nickel nitrate solution.
3. An electrode structure of nickel hydroxide consisting of a sintered electrode substrate consisting of gold with a surfacing of active nickel hydroxide.
4. The method of preparing an electrode consisting of the steps of molding and sintering a gold substrate consisting of gold particles of a size from 1 to 10 microns, impregnating the sintered substrate with a solution of nickel nitrate and converting the nickel nitrate to nickel hydroxide.
5. The method of claim 4 wherein the impregnation is effected by boiling the solution of nickel nitrate with the said substrate therein.

References Cited

UNITED STATES PATENTS

| | | | |
|---|---|---|---|
| 2,654,795 | 10/1953 | Brill et al. | 136—28.11 |
| 2,737,541 | 3/1956 | Coolidge | 136—28 |
| 3,132,054 | 5/1964 | Carson | 136—120 |
| 3,226,263 | 12/1965 | Oswin. | |
| 3,235,473 | 2/1966 | Le Duc. | |
| 3,332,806 | 7/1967 | Peller et al. | |
| 3,335,033 | 8/1967 | Kober | 136—28 |
| 3,388,004 | 6/1968 | Rosenblatt. | |
| 3,393,098 | 7/1968 | Hartner et al. | |

WINSTON A. DOUGLAS, Primary Examiner

C. F. LeFEVOUR, Assistant Examiner

U.S. Cl. X.R.

136—29, 120